United States Patent

Shinada et al.

[11] Patent Number: 5,828,180
[45] Date of Patent: Oct. 27, 1998

[54] DRIVING METHOD OF DISCHARGE APPARATUS

[75] Inventors: Shinichi Shinada, Kokubunji; Soichiro Ogawa, Mizuho-machi; Shigeo Mikoshiba, Tokyo; Tomokazu Shiga, Hachioji, all of Japan

[73] Assignee: Hitachi, Ltd., Tokyo, Japan

[21] Appl. No.: 668,779

[22] Filed: Jun. 24, 1996

[30] Foreign Application Priority Data

Jun. 28, 1995 [JP] Japan ................................. 7-161744

[51] Int. Cl.⁶ .................................................. H05B 37/00
[52] U.S. Cl. ..................... 315/160; 315/168; 315/169.1; 315/337
[58] Field of Search .................................... 315/160, 167, 315/168, 169.1, 169.4, 334, 337, 339; 313/491, 493

[56] References Cited

U.S. PATENT DOCUMENTS

| | | | |
|---|---|---|---|
| 4,081,715 | 3/1978 | Uemura | 315/167 X |
| 4,461,978 | 7/1984 | Mikoshiba et al. | 315/169.4 |
| 5,233,272 | 8/1993 | Whang et al. | 315/168 |
| 5,463,274 | 10/1995 | Winsor | 313/493 |

Primary Examiner—Robert J. Pascal
Assistant Examiner—Haissa Philogene
Attorney, Agent, or Firm—Antonelli, Terry, Stout & Kraus, LLP

[57] ABSTRACT

In order to operate a discharge apparatus, a first voltage having a first frequency is applied to electrodes. Moreover, a second voltage having a second frequency higher than the first frequency is applied to the first voltage. The waveform of the voltage having the second frequency may be an attenuated one which is synchronized with the first frequency. As a result of this voltage superposition, the electrons, ions, or plasma in the already established discharge fluctuate with the change in the electric field. If the second frequency is selected to be equal or close to the resonance frequency of the electrons, ions, or plasma existing in the already established discharge, there occurs the resonance phenomenon of the electrons, ions, or plasma. This phenomenon raises the temperature of those particles. As a result, the electron temperature approaches to a value preferable for emission of visible light or ultraviolet rays so that the luminous efficiency is improved.

14 Claims, 14 Drawing Sheets

DRIVING METHOD OF DISCHARGE APPARATUS

BACKGROUND OF THE INVENTION

The present invention relates to a discharge apparatus for emitting visible or ultraviolet light and, more particularly, to a driving method of a discharge apparatus to be used as light sources for illuminating or displaying indoors or outdoors or for the backlight of a liquid crystal display.

There are a variety of methods for driving a light source using the discharge such as an illuminating or displaying fluorescent lamp or a plate type discharge apparatus. According to the conventional method of driving an inverter for lighting the liquid crystal backlight, as disclosed in Japanese Patent Laid-Open No. 63-110962, for example, the fluorescent lamp is turned on by using sinusoidal waves of several tens kHz. The discharge tube is exemplified by a cold-cathode or hot-cathode fluorescent lamp having a diameter of about 3 to 6 mm, in which is confined mercury or argon. The ultraviolet light generated by the discharge excites and causes the phosphor to emit the light thereby to illuminate the liquid crystal panel and display letters and/or images.

On the other hand, the general illumination lamp is turned on with 50 or 60 Hz. However, there is a lamp to be turned on with several tens kHz.

However, the discharge apparatus using the aforementioned driving method is troubled by the fact that the luminous efficiency drops to increase the power consumption the more as the diameter of the discharge tube becomes the smaller. For example, the luminous efficiency of the fluorescent lamp having a diameter of 2 to 3 mm, as used as a backlight of a liquid crystal display device, is about one half at most of that of an indoor illuminating fluorescent lamp having a diameter of about 25 mm, and forms a major cause for disabling the power consumption of the liquid crystal display device to be reduced. Especially for the battery driven type liquid crystal display device such as a note type personal computer, it is a serious target to reduce the power of the backlight.

SUMMARY OF THE INVENTION

An object of the present invention is to provide a driving method for improving the luminous efficiency of such discharge apparatus and for reducing the power consumption.

In order to achieve the above-specified object, the driving method of a discharge apparatus according to the present invention employs a voltage having a drive waveform different from that of the prior art. Specifically, in order to discharge a discharge apparatus, a first voltage having a first frequency is applied to electrodes. Moreover, a second voltage having a second frequency higher than the first frequency is superposed on the first voltage. The waveform of the voltage having the second frequency may be an attenuated one which is synchronized with the first frequency. Here, the discharge apparatus implies not only the ordinary discharge tube but also widely an apparatus having a discharge container for forming a discharge space.

According to the present invention, the first voltage having the first frequency is applied to the discharge apparatus thereby to establish a discharge. Then, the second voltage having the second frequency is superposed. As a result of this voltage superposition, the electrons, ions, or plasma in the already established discharge fluctuate with the change in the electric field. If the second frequency is selected to be equal or close to the resonance frequency of the electrons, ions, or plasma existing in the already established discharge, there occurs the resonance phenomenon of the electrons, ions, or plasma. This phenomenon raises the temperature of those particles. As a result, the electron temperature approaches to a value preferable for visible or ultraviolet light so that the luminous efficiency is improved.

In the conventional discharge tube such as a fluorescent lamp, most of the space charge necessary for sustaining the discharge is established in the negative glows. A relatively high power is required for generating the negative glows. According to the present driving method, however, the negative glows may be low because the electron density or ion density especially at the positive column increases. As a result, the power to be injected into the discharge tube may be so low that the luminous efficiency can be improved. Moreover, the discharge-sustaining voltage is so dropped that the power consumption can be drastically reduced.

DESCRIPTION OF THE PREFERRED EMBODIMENTS

Figure 1:
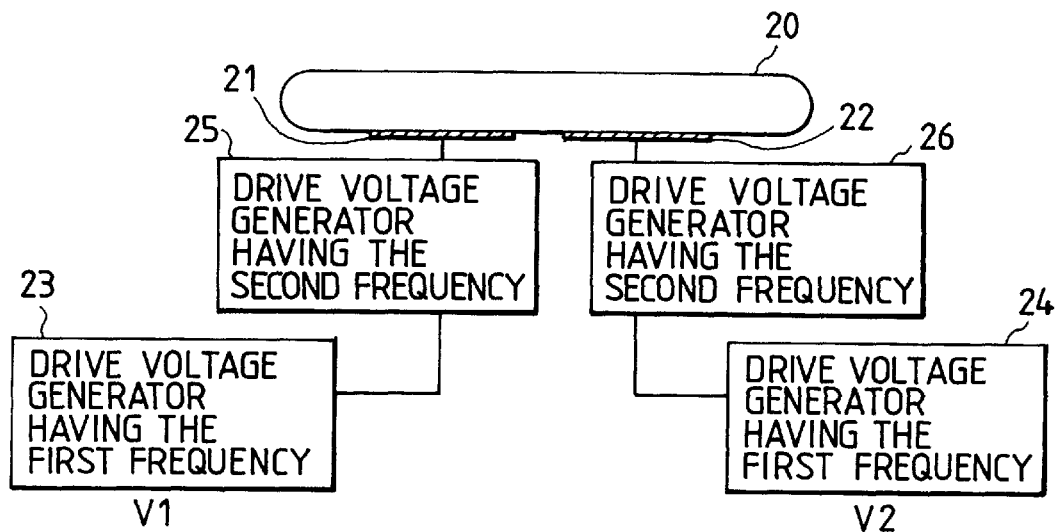
FIG. 1 is a schematic diagram showing one embodiment of a discharge apparatus driving method according to the present invention.

Here will be described the embodiments of the present invention with reference to the accompanying drawings. FIG. 1 is a schematic diagram showing a driving method of an external electrode type discharge tube according to one embodiment of the present invention. In FIG. 1, reference numeral 20 designates a discharge tube, numerals 21 and 22 electrodes mounted on the outer face of the discharge tube, numerals 23 and 24 drive voltage generators having a first frequency, and numerals 25 and 26 second drive voltage generators having a second frequency and coupled to the drive voltage generators 23 and 24, respectively. Reference letters V1 and V2 designate voltages to be applied to the electrodes 21 and 22, so that the so-called "electrodeless discharge" of field discharge type is effected by superposing the second voltage having the second frequency higher than the first frequency on the first voltage having the first frequency.

Figure 2:
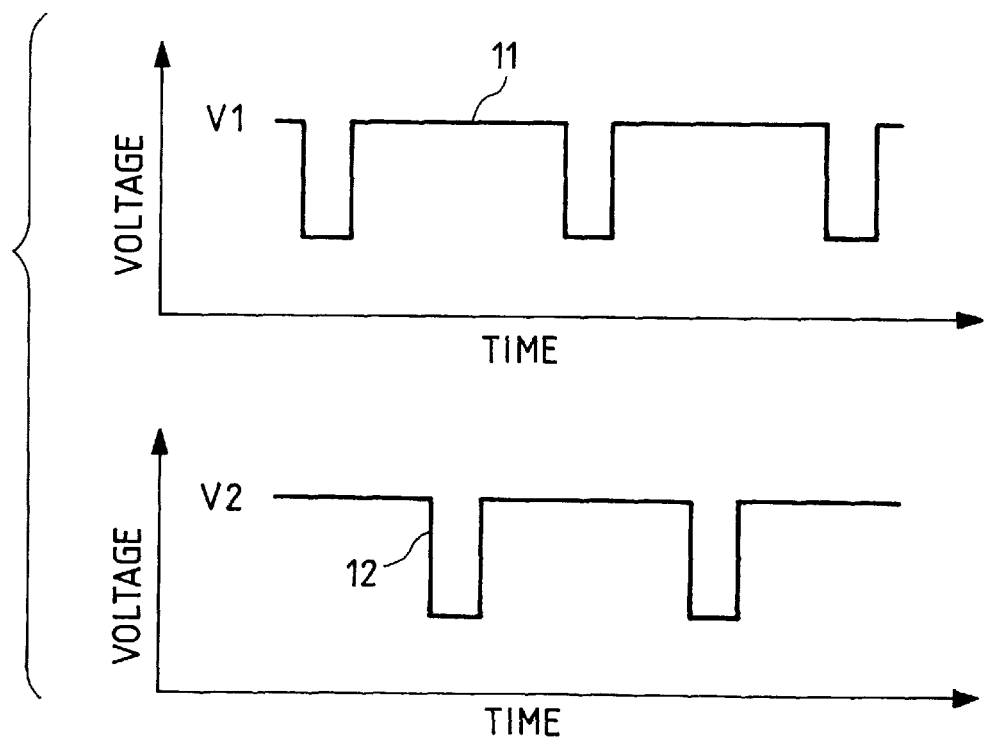
FIG. 2 is a voltage waveform diagram of the driving method according to the embodiment of the present invention.
Figure 3:
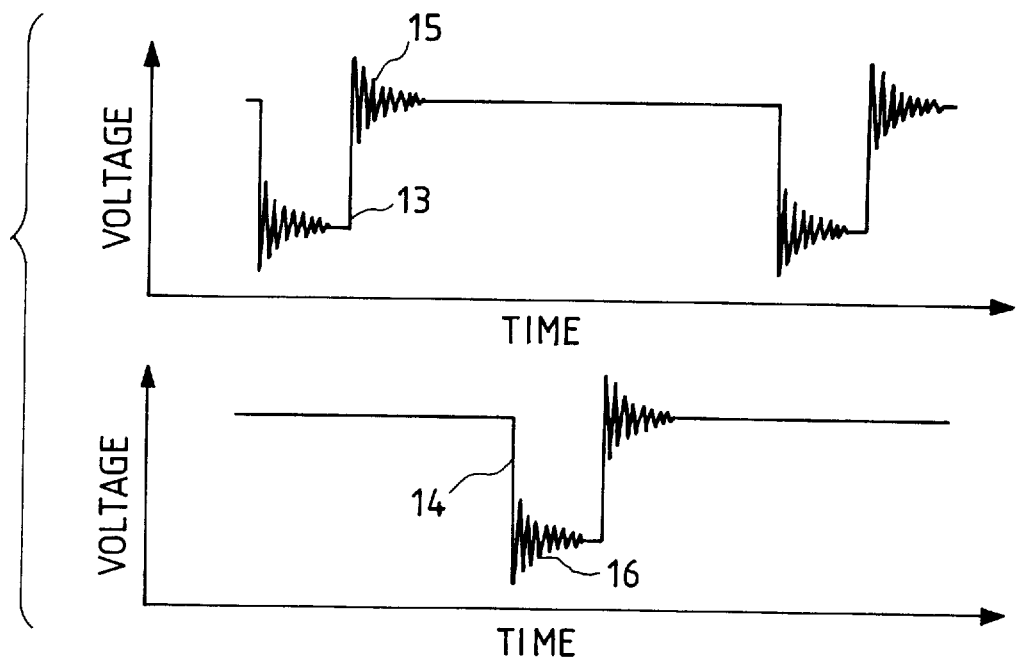
FIG. 3 is a voltage waveform diagram of the driving method according to the embodiment of the present invention.

FIGS. 2 and 3 are diagrams showing the voltage waveforms according to one embodiment of the drive waveform. From the drive voltage generator having the first frequency, as shown in FIG. 2, there are generated the rectangular wave voltage V1, as indicated at 11, and the rectangular wave voltage V2 shifted a half period with respect to 11, as indicated at 12. To these waveforms 11 and 12, moreover, there are superposed voltages such as attenuated sinusoidal voltages 15 and 16 having the second frequency, as obtained from the drive voltage generators having the second frequency. Voltage waveforms 13 and 14, as shown in FIG. 3, are the discharge voltage waveforms which can effect a high efficiency when applied to the discharge tube.

Figure 4:
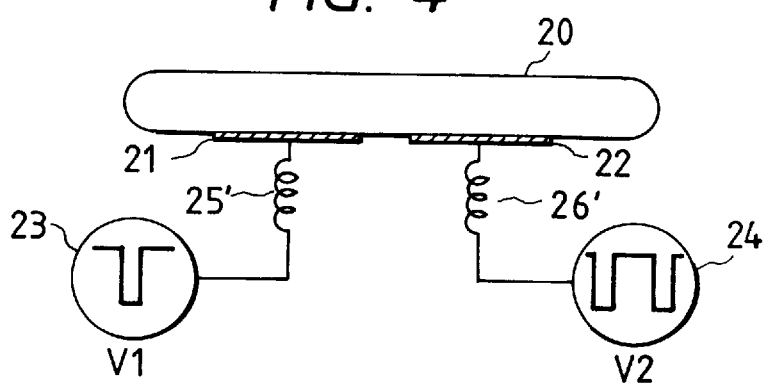
FIG. 4 is a schematic diagram showing the apparatus, as used for measurements.

Here will be described the results obtained by driving the discharge tube using the drive waveform according to the present invention and by metering the discharge luminous characteristics. The construction of the apparatus, as used for the metering, is shown in FIG. 4. The discharge tube 20 is made of soda glass and has a diameter of 3.1 mm. The paired electrodes 21 and 22 are given a length of 10 mm and a width of 5 mm and are mounted on the outer surface of the discharge tube. These electrodes are spaced by 3 mm, and the discharge tubes, as lined with and without trichromatic white phosphors, are presented for the metering. For example, mercury, 54 Torr of neon and 6 Torr of argon are confined in the discharge tube.

The fundamental shape of the drive voltage waveform is identical to that shown in FIG. 3. Coils 25' and 26' are employed for the second rectangular waveform voltage generating circuit, and the drive voltage having the second frequency is exemplified by the voltage which is generated by the ringing between the coils 25' and 26' and the stray capacitance of the circuit. This drive condition will be called the drive with coil in the present embodiment.

In the present embodiment, the second drive voltage generator is exemplified by the simple construction of coils but may be any inductive component.

Figure 5:
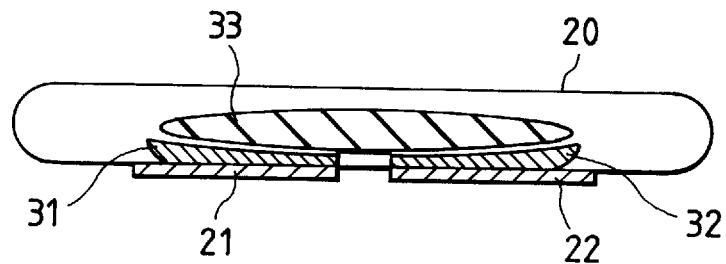
FIG. 5 is a schematic diagram showing a discharge state in a discharge tube.

FIG. 5 is a schematic diagram showing the state of the discharge which is established by the conventional drive method, as exemplified by the drive voltage waveform shown in FIG. 2. This diagram presents the observation of the discharge tube having no phosphor applied thereto. Negative glows 31 and 32 are formed in the vicinity of the electrodes 21 and 22. A positive column 33 is formed above the negative glows and between the electrodes.

Figure 6A:
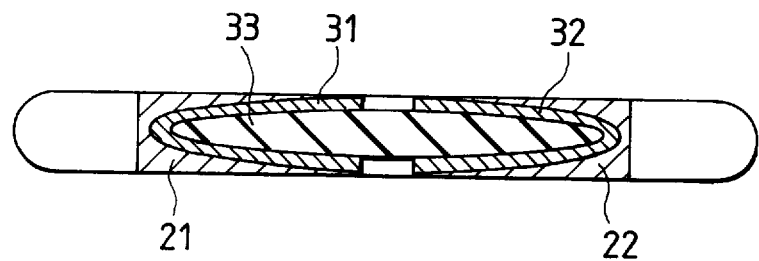
FIGS. 6A to 6D are schematic diagrams showing the discharge states in the discharge tube according to the conventional driving methods.
Figure 6B:
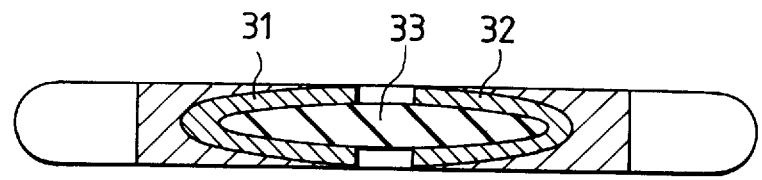
Figure 6C:
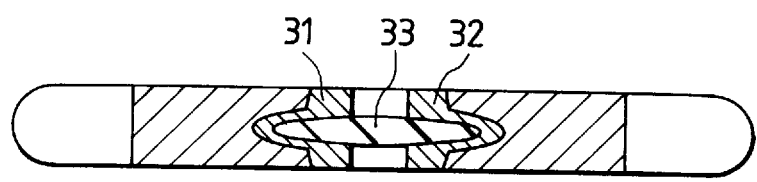
Figure 6D:
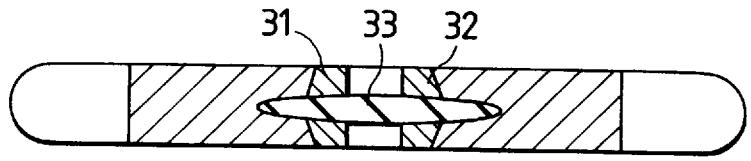

FIGS. 6A to 6D are schematic diagrams showing the changes in the discharge state for the case in which the pulse width (i.e., the width of the drive voltage pulse, as shown in FIG. 2) is gradually narrowed with the applied voltage being held constant by the conventional drive method. FIG. 6A shows the discharge state for the pulse width of about 1.7 $\mu$s, which is gradually narrowed as shown in FIGS. 6B and 6C, and FIG. 6D shows the discharge state for the pulse width of about 100 ns.

As the pulse width is made narrower, both the negative glows 31 and 32 and the positive column 33 become weaker in their luminous intensities, and the negative glows become smaller. This resulted from the decline in discharge because the current decreases with the decreasing pulse width and because the rise in the wall voltage due to the wall charge established by the discharge causes a drop in the effective voltage between the electrodes. However, when the pulse width becomes as small as 100 ns or less, it has been observed that the negative glow region decreased whereas the positive column region increased.

Figure 7A:
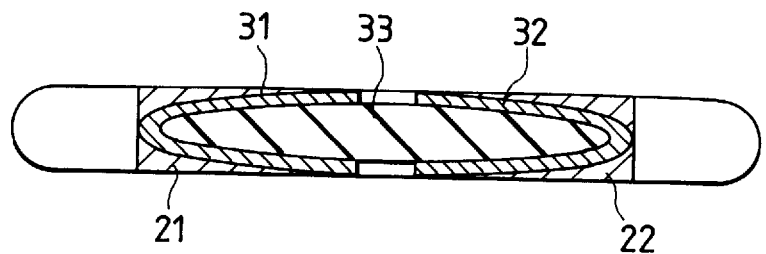
FIGS. 7A to 7D are schematic diagrams showing the discharge states in the discharge tube when the driving method of the present invention is used.
Figure 7B:
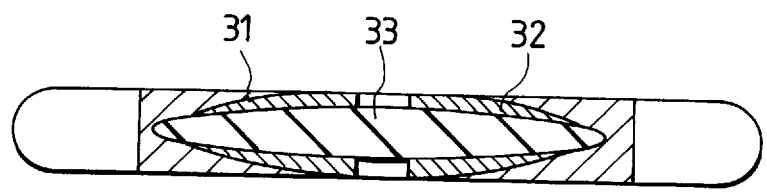
Figure 7C:
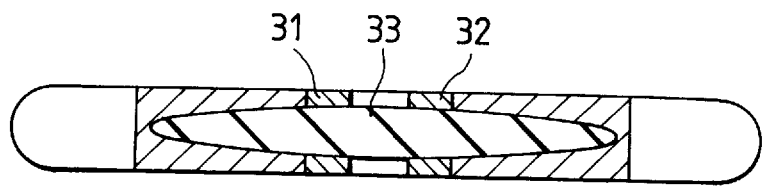
Figure 7D:
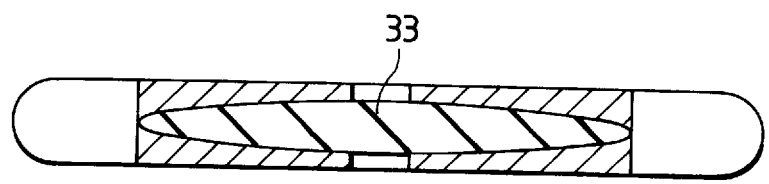

FIGS. 7A to 7D show examples of discharge with the coils at the same set voltage level. Like FIGS. 6A to 6D, FIG. 7A shows the discharge state for the pulse width of about 1.7 $\mu$s, which is gradually narrowed as shown in FIGS. 7B and 7C, and FIG. 7D shows the discharge state for the pulse width of about 100 ns.

As compared with the conventional drive shown in FIGS. 6A to 6D, the drive method of the present invention is characterized in that the region occupied by the positive column 33 increases whereas the region occupied by the negative glows 31 and 32 decreases. For the drive with coil, the voltage applied to the discharge tube is higher than in the conventional method because of the ringing caused in the voltage pulses. Thus, an attempt to drive at this high voltage in the conventional method shows an increase in only the emission from the positive column 33 but also the red emission from the neon glow (or negative glows) over the electrodes, which is apparently different from that of the drive with coil.

For the drive with coil, too, the negative glow region becomes smaller as in the conventional drive method as the pulse width is gradually decreased. However, the positive column is held substantially constant in length although its luminous intensity slightly decreases. In the case of the drive with coil, too, the positive column region is found to increase as in the conventional drive method, when the pulse width decreases to 200 ns or less. For a sufficiently small pulse width, the discharge is finally effected with little negative glow.

Figure 8:
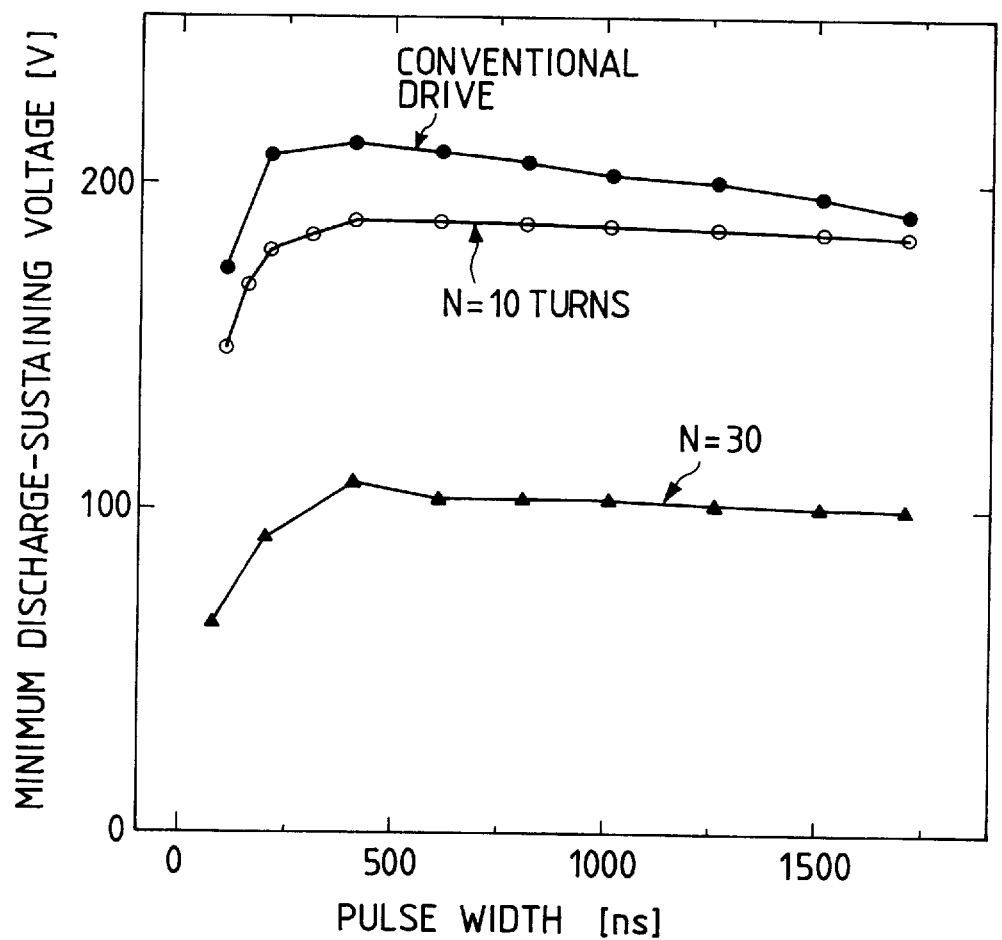
FIG. 8 is a diagram plotting the relations between the number of coil turns and the minimum discharge-sustaining voltage.

FIG. 8 plots the changes in the minimum discharge-sustaining voltage against the pulse width which is metered for different numbers of turns of coil. The minimum discharge-sustaining voltage is changed by changing the number of turns of coil. This is because the change in the number of turns of coil leads to the change in inductance and accordingly to the frequency, voltage and attenuation constant of the ringing. If the conventional drive method is used, the minimum discharge-sustaining voltage grows to the higher level for the smaller pulse width. This is thought to come from the fact that the wall voltage generated for the pulse application period drops to decrease the effective voltage as the pulses become narrower. For the pulse width of 100 ns or less, the minimum discharge-sustaining voltage drops. This pulse width coincides with that at which the increase in the positive column region is found. As seen from FIG. 8, the minimum discharge-sustaining voltage can be lowered for the drive of 30 turns of coil, by using the drive method of the present invention, to one half or less than that of the conventional drive method.

According to the drive with coil according to the present invention, the negative glow region can be made smaller than that of the conventional drive. It is thought that the drop of the minimum discharge-sustaining voltage is caused by the cathode voltage drop. When the coil used has twenty or more turns, on the other hand, oscillations may occur in the narrow pulse region. This occurrence depends upon the balance between the set pulse width and the ringing period.

Figure 9:
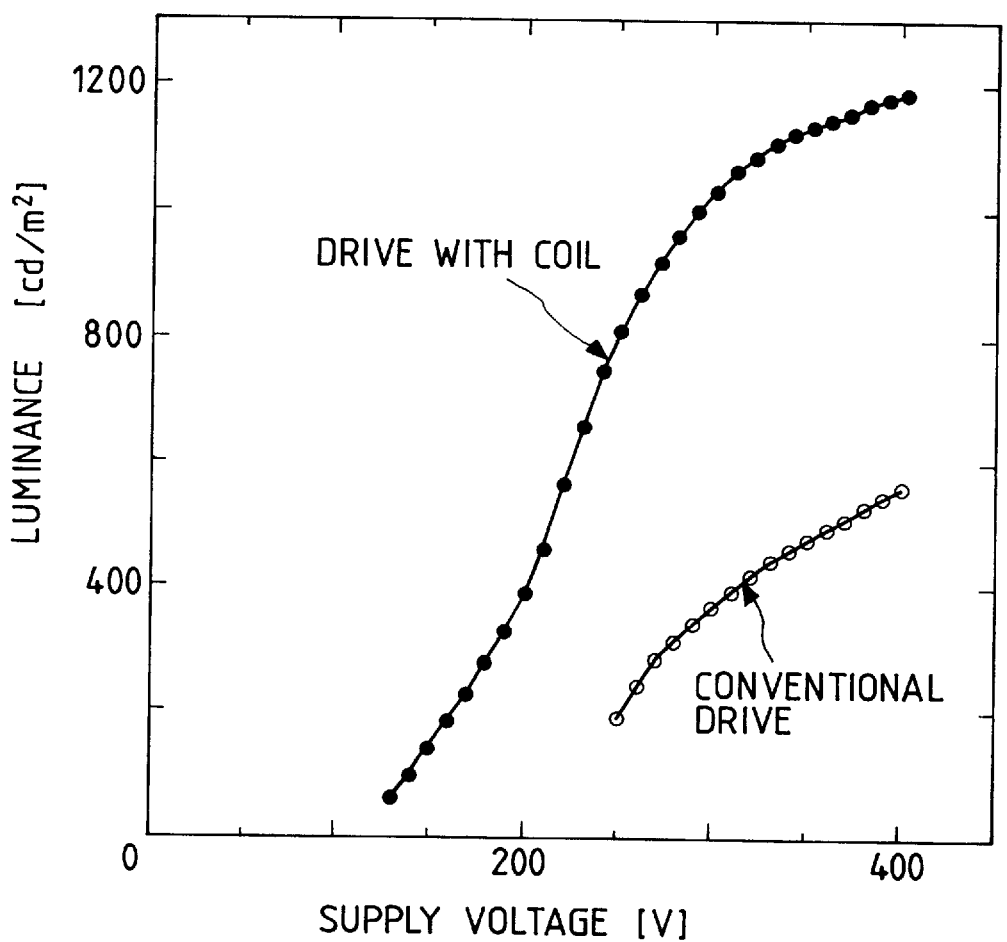
FIG. 9 is a diagram plotting the relations between the supply voltage and the luminance.

FIG. 9 plots the luminance changes against the applied voltage by the driving method with coil according to the present invention and the conventional driving method for the pulse width of 1.7 $\mu$s. This luminance is metered from the circle having a diameter of 1 mm, to which the phosphor is applied, at the center portion between the electrodes of the discharge tube so that the drive with coil, in which the increase in the luminance of the positive column region is drastically increased, as compared with that of the ordinary drive.

Figure 10:
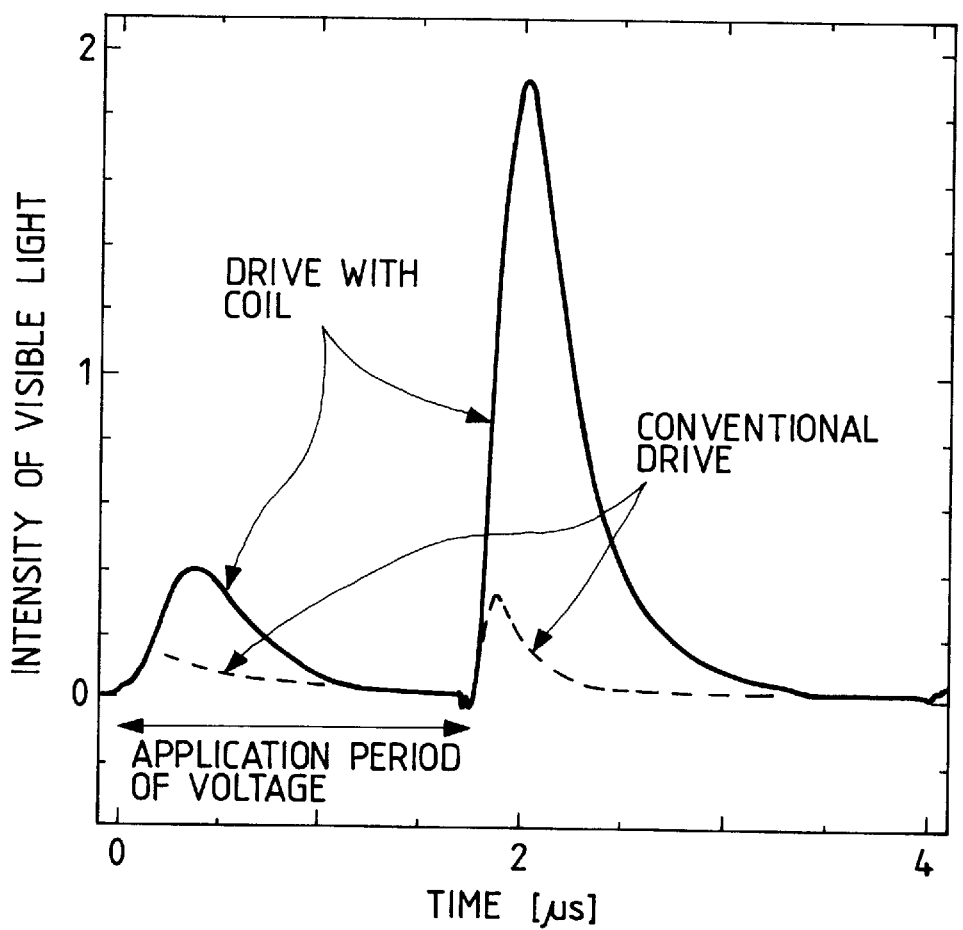
FIG. 10 is a diagram showing the time change in the intensity of light in a discharge tube when the driving method of the present invention is used.

FIG. 10 plots the waveforms of visible light, as observed by a photomultiplier. The metering location is on the center axis of the discharge tube and at the center portion between the electrodes 21 and 22. The waveform of visible light is plotted by a solid curve for the drive with thirty turns of coil and by a broken curve for the conventional drive. The intensity of visible light is far more increased for the drive with coil than the conventional drive. Especially, the secondary visible light after the end of the pulse application is remarkably intense. The waveform of this secondary visible light is substantially identical to the attenuation waveform of the ringing at the pulse end.

Figure 11:
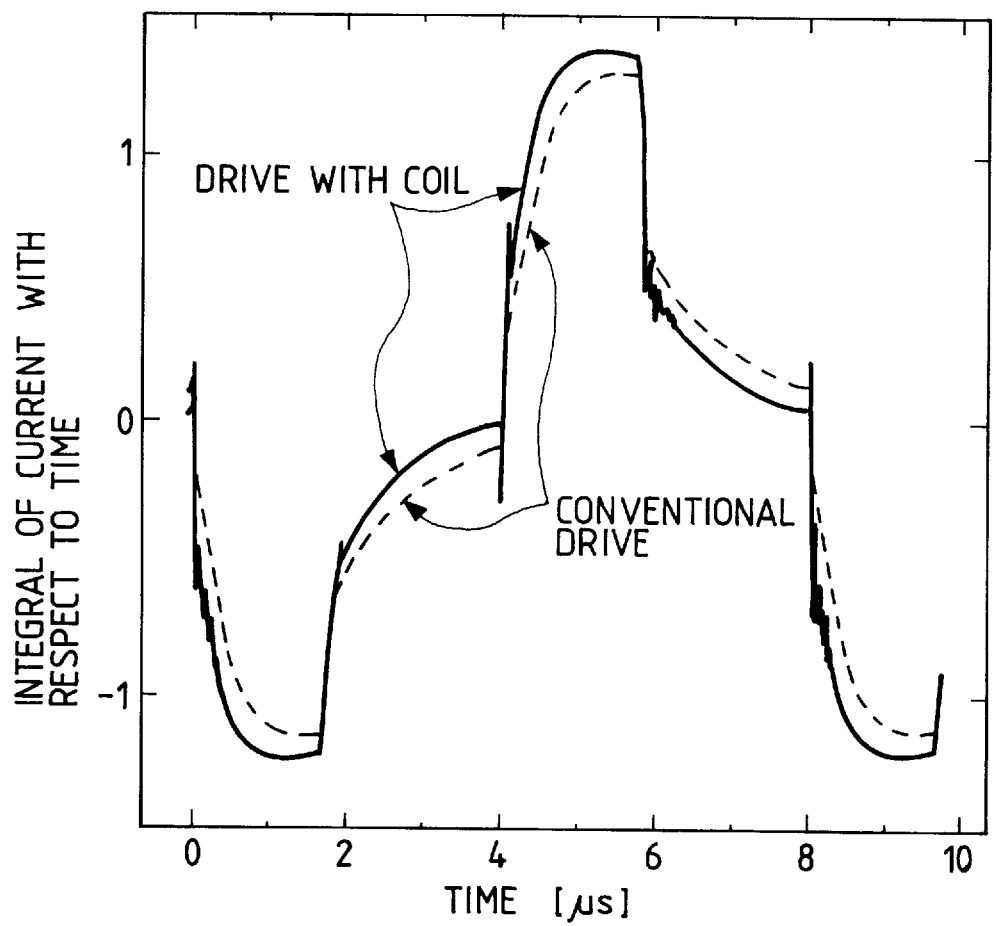
FIG. 11 is a waveform diagram showing an integral of current with respect to time.

FIG. 11 plots the waveforms of the metered discharge current which is integrated with respect to time by a current transformer. The rectangular voltage having the first frequency has a period of 8 $\mu$s, a pulse width of 1.7 $\mu$s and an applied voltage of 300 V, and the waveform of the drive with coil according to the present invention is plotted by a solid curve whereas the waveform of the conventional drive is plotted by a broken curve. This current waveform contains the displacement current which will flow when the stray capacitor of the discharge tube is charged/discharged. As seen from FIG. 11, however, the current will slightly increase in the drive with coil but without any substantial difference. The drive with coil according to the present invention has no substantial difference in the discharge current from the conventional drive but has a higher luminance, i.e., a higher luminous efficiency.

Figure 12:
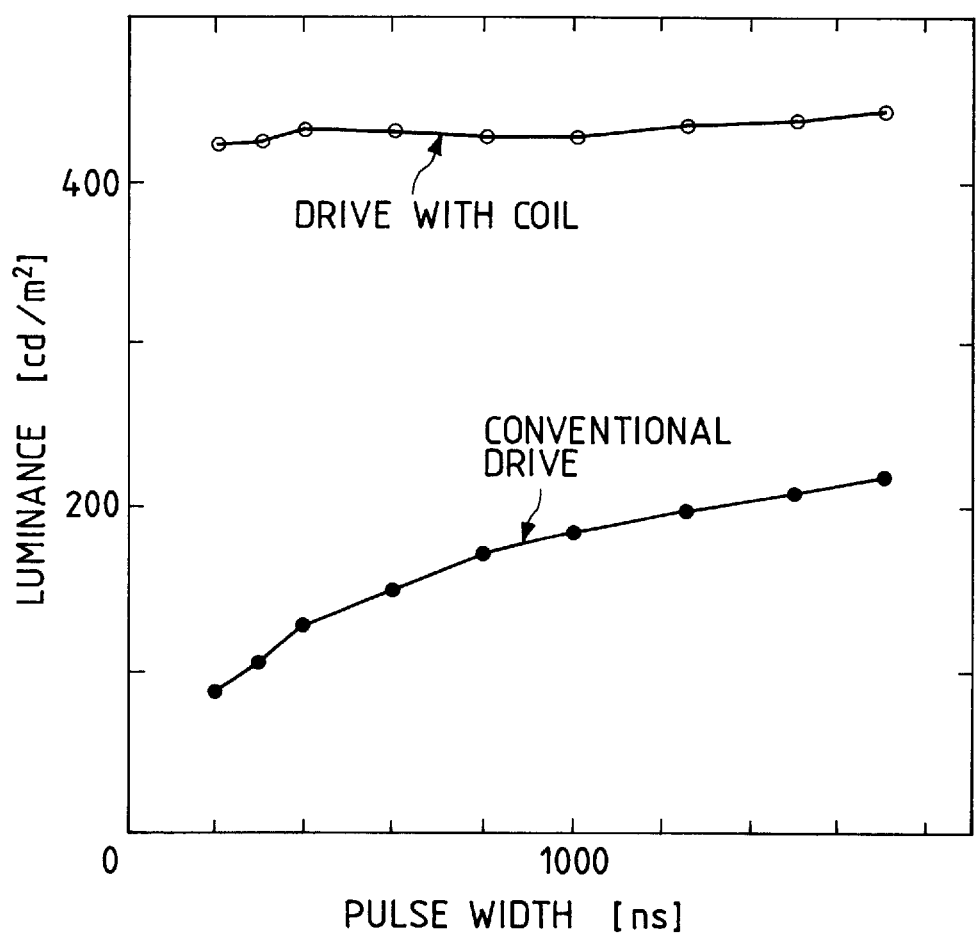
FIG. 12 is a diagram plotting a pulse width and a luminance.

FIG. 12 plots the relations between the pulse width of the rectangular voltage having the first frequency and the luminance when the supply voltage is held at 300 V. In the case of the conventional drive, the luminance decreases the more for the smaller pulse width. In the drive with coil according to the present invention, on the other hand, the luminance is held substantially constant. This is because the positive column region increases according to the drive method of the present invention irrespective of the decrease in the negative glow region although the pulse width is reduced, so that the luminance does not drop.

Figure 13:
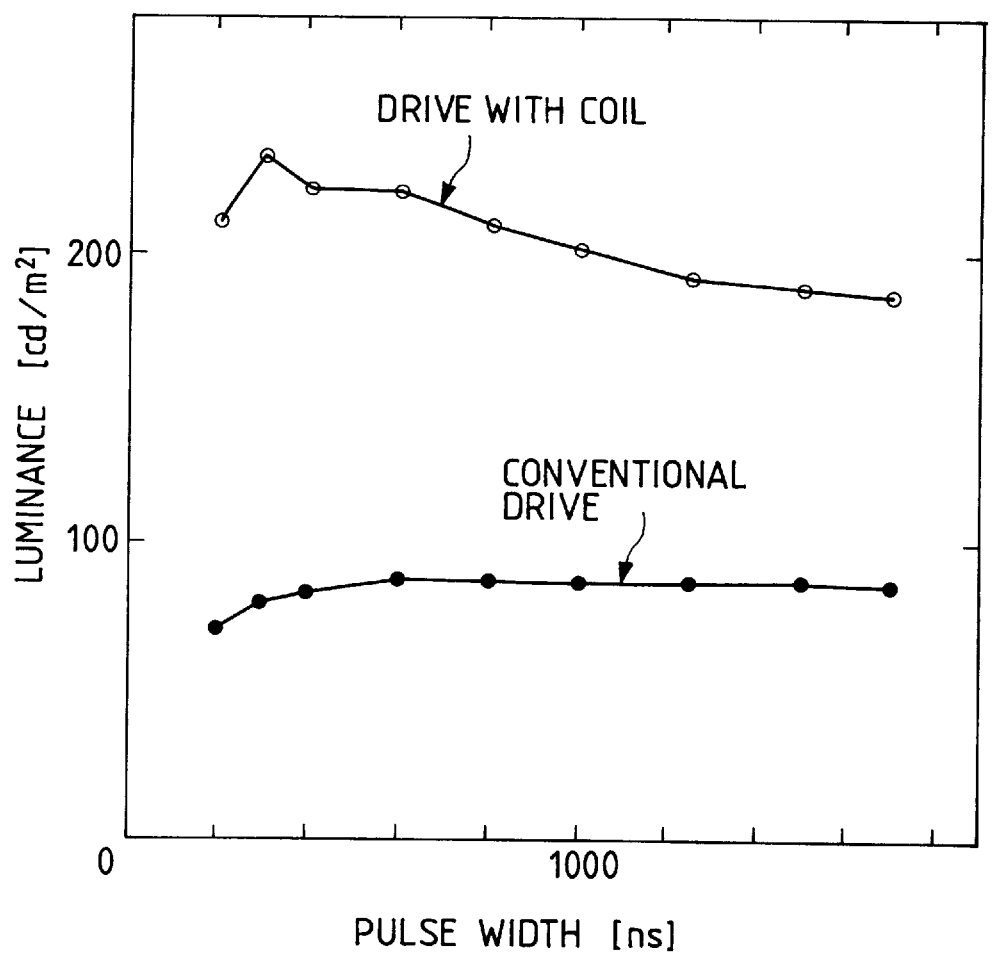
FIG. 13 is a diagram plotting the relations between the pulse width and the luminance for a constant integral of current with respect to time.
Figure 14:
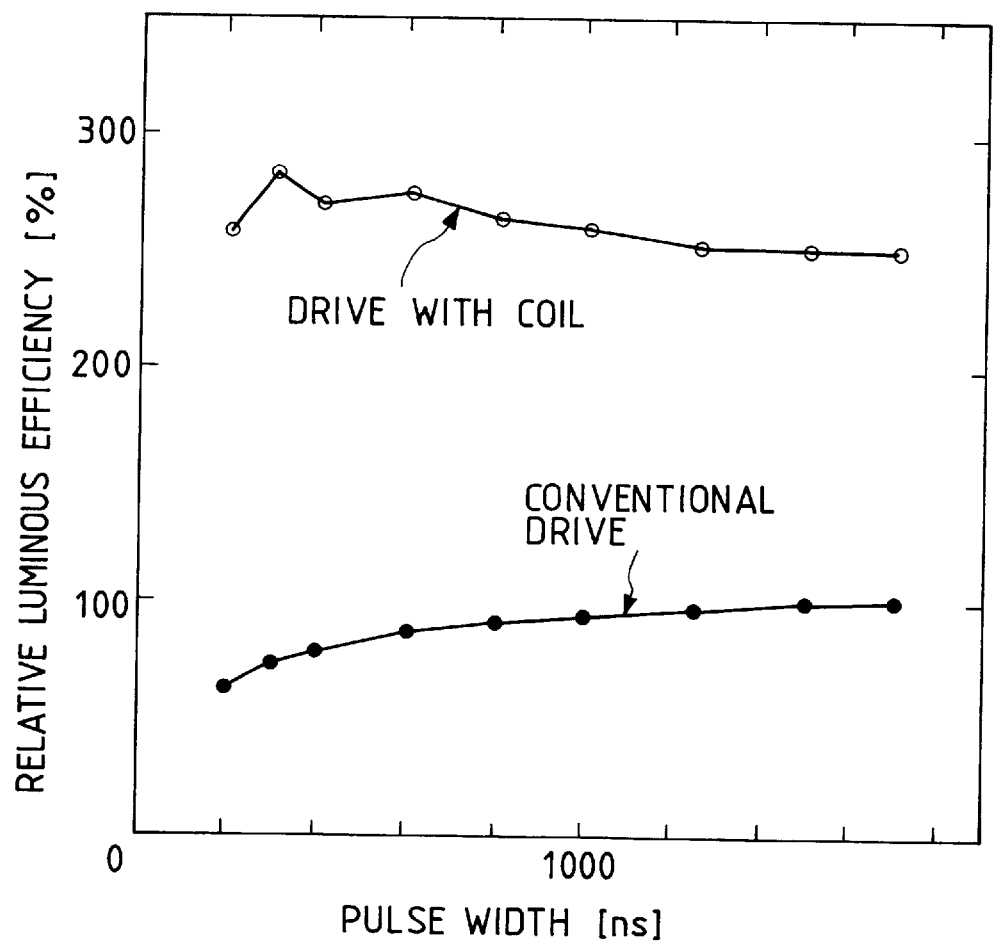
FIG. 14 is a diagram plotting the relations between the pulse width and the luminous efficiency for a constant integral of current with respect to time.

Here will be described the results obtained by comparing the luminance and the luminous efficiency for the constant integral of current with respect to time. FIG. 13 plots the luminances against the pulse width of the rectangular voltage having the first frequency, and FIG. 14 plots the luminous efficiency against the pulse width of the rectangular voltage having the first frequency. The metering was performed by setting the applied voltages for the individual pulse widths so that the current value might be equalized to that at the voltage 220 V for the maximum efficiency according to the conventional drive.

The driving method according to the present invention can achieve a luminance twice or more, as shown in FIG. 13, for the current value integrated with respect to time. Since the current value integrated with respect to time is higher for the drive with coil at the equal applied voltage, as shown in FIG. 11, the applied voltage for each pulse width becomes lower for the drive with coil according to the present invention. Thanks to the twice or more luminance and the lower applied voltage, the luminance efficiency for the drive with coil rises to about three times that of the conventional driving method, as shown in FIG. 14.

If the driving method of the present invention is employed in a liquid crystal display device of a note type personal computer or the like, the power for the backlight can be reduced to provide a highly luminous display device of low power consumption.

Figure 15:
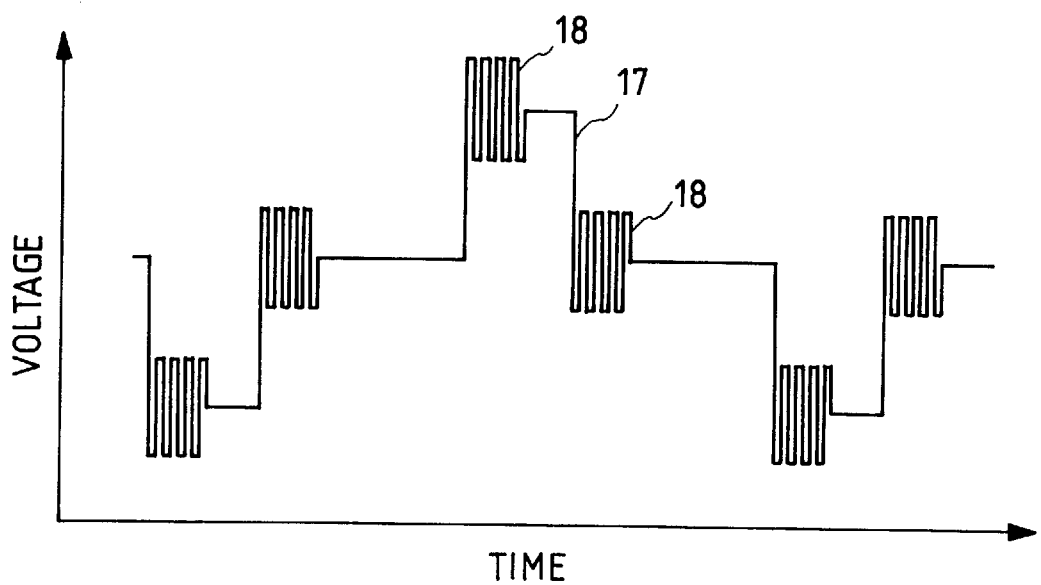
FIG. 15 is a diagram showing a drive voltage waveform according to another embodiment of the present invention.
Figure 16:
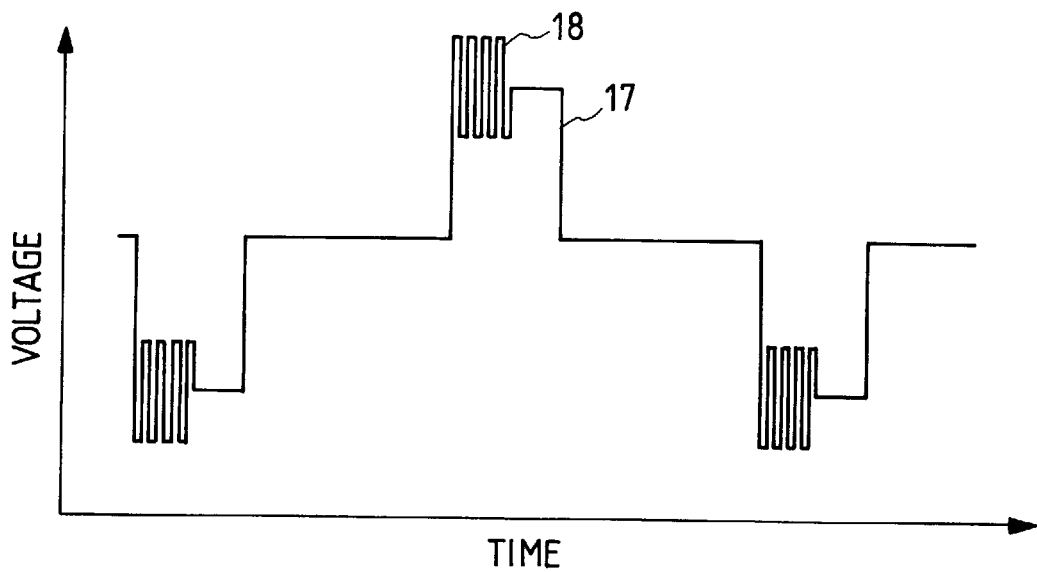
FIG. 16 is a diagram showing a drive voltage waveform according to still another embodiment of the present invention.
Figure 17:
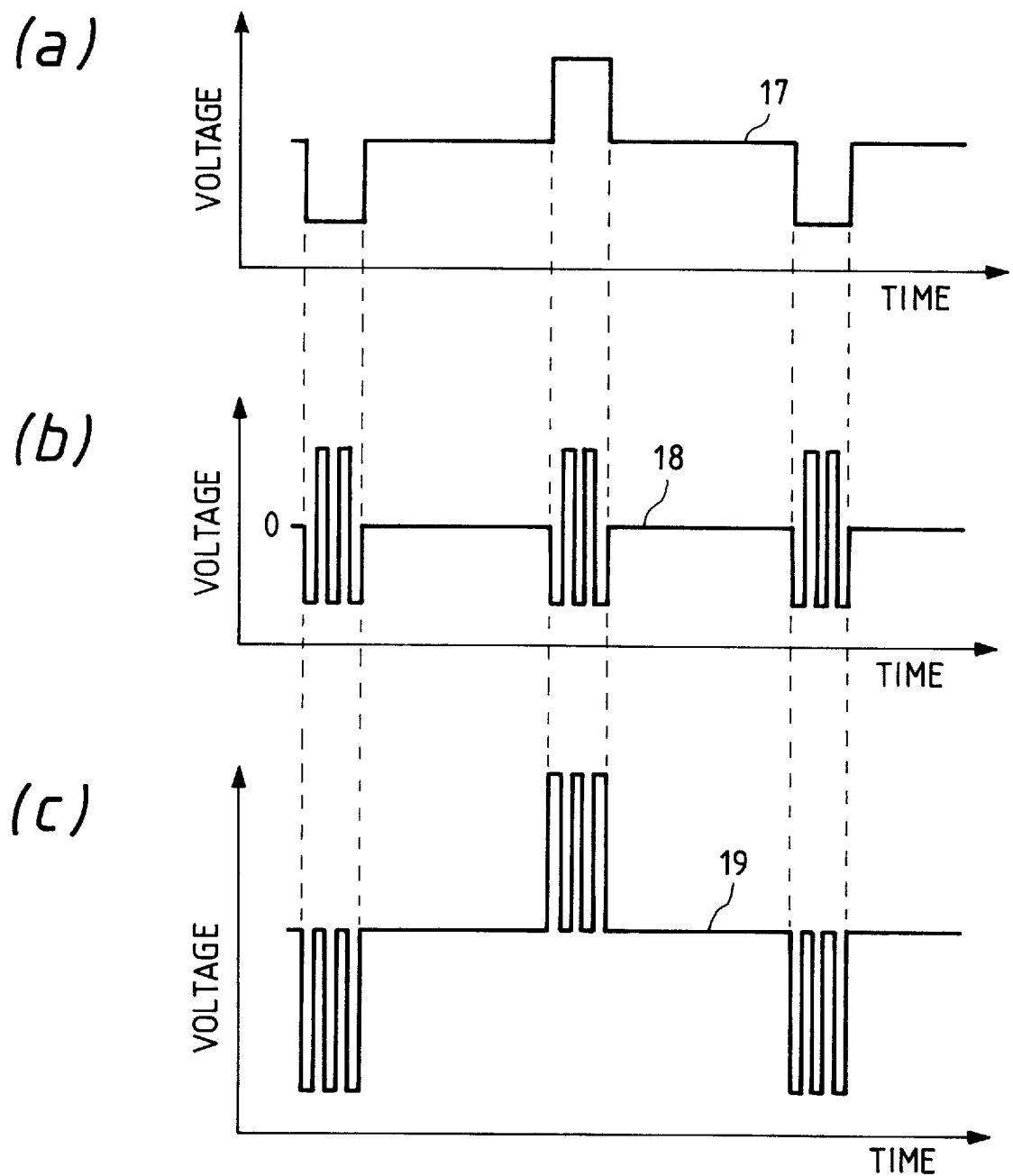
FIG. 17 is a diagram showing a drive voltage waveform according to further embodiment of the present invention.
Figure 18:
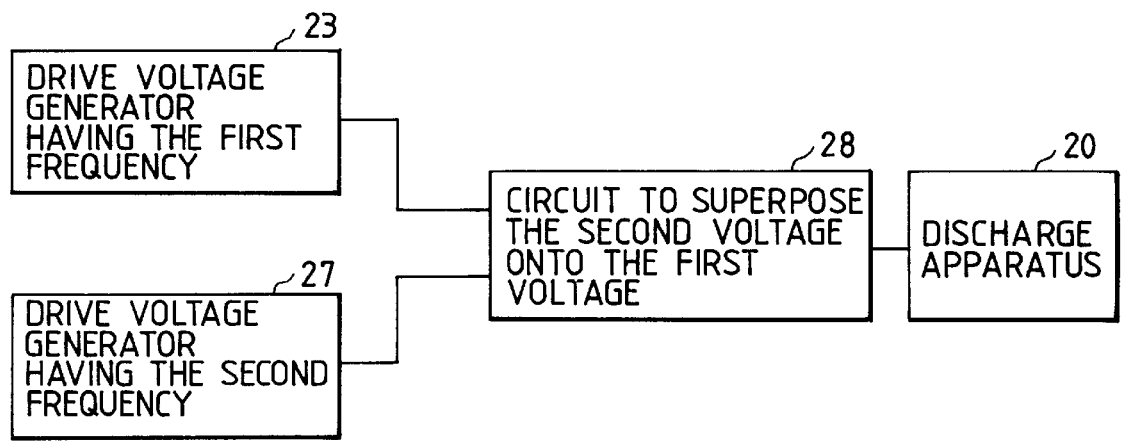
FIG. 18 is a flow chart showing a circuit according to the present invention.

The driving voltage waveform of another embodiment of the present invention are shown in FIG. 15, 16 or 17. In these figures, reference numeral 17 indicates a first voltage waveform having the first frequency, numeral 18 indicates a second voltage waveform having the second frequency, and numeral 19 indicates the superposed waveform of the first and second voltages. Identical effects can be achieved, too, by using the waveforms of those embodiments. Moreover, the first and second voltages may have sinusoidal, rectangular, step or other waveforms. These waveforms can also be prepared by the circuit of FIG. 18, for example. In these figures, reference numeral 23 designates the first voltage generator having the first frequency, numeral 27 designates a second voltage generator having the second frequency, numeral 28 designates a circuit for superposing the first and second voltages, and numeral 20 designates a discharge apparatus.

In the foregoing embodiments thus far described, the first voltage is exemplified by one having a period of 8 $\mu$s and a pulse width of 1.7 $\mu$s. Despite of this fact, however, effects similar to the aforementioned ones can be achieved if the first voltage is conditioned to have a frequency of 30 kHz or more and if the rectangular pulses are conditioned to have a width of 10 $\mu$s or less. Moreover, the effect of improving the luminous efficiency is high if the peak-to-peak value of the voltage having the second frequency is lower than that of the voltage having the first frequency.

On the other hand, the foregoing embodiments have been described in connection with the external electrode type discharge tube. Despite of this description, however, the electrodes may be disposed in the discharge tube as in the fluorescent lamp, and the present invention can naturally be applied to the plate type discharge apparatus.

Figure 19:
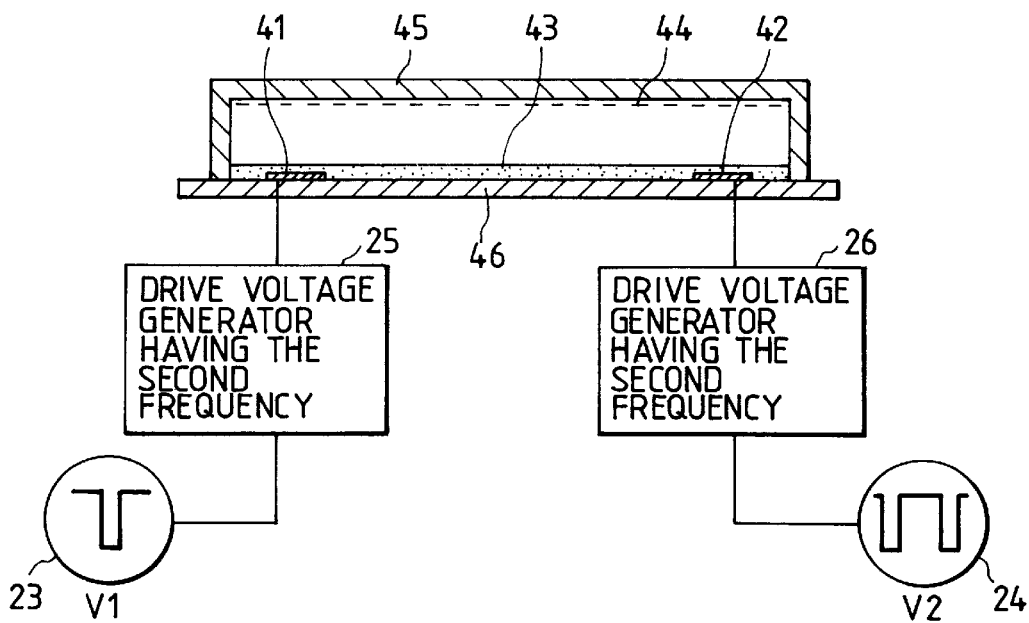
FIG. 19 is a schematic diagram showing an example in which the present invention is applied to a plate-type discharge apparatus.

FIG. 19 shows an example in which the present invention is applied to a plate-type discharge apparatus. In FIG. 19, reference numerals 23 and 24 designate drive voltage generators having the first frequency, and numerals 25 and 26 designate second drive voltage generators having the second frequency and coupled to the drive voltage generators 23 and 24, respectively. Numerals 41 and 42 designate discharge electrodes which are formed over a substrate 46 made of soda glass, for example, and covered all over their surfaces with a dielectric 43. Numeral 45 designates a face plate made of soda glass, too, and a phosphor 44 is applied to the inner face of the face plate 45. In the face plate 45, there is confined at least one material selected from the group consisting of mercury, xenon gas, krypton gas, argon gas, helium gas, and neon gas. The present plate type discharge apparatus has operations and effects similar to those of the foregoing discharge tube.

As has been described, according to the driving method of the present invention, the voltage to be applied to the electrodes is simply exemplified not only by applying the first voltage having the first frequency but also by superposing the second voltage having the second frequency higher than the first frequency to the first voltage. By this simple driving method, it is possible to enhance the luminance and luminance efficiency of the discharge apparatus and to lower the discharge-sustaining voltage. As a result, the power to be consumed by the discharge apparatus can be drastically reduced to provide a liquid crystal display device of low power consumption suited for the battery drive or the like.

What is claimed is:

1. A driving method of a discharge apparatus having a discharge space and a pair of electrodes, comprising the steps of:

applying a first voltage having a first frequency between the electrodes; and applying a second voltage having a second frequency, which is higher than the first frequency, between the electrodes by superposing the second voltage on the first voltage;

wherein the first voltage and the second voltage superposed thereon applied between the electrodes establish a discharge in the discharge space.

2. A driving method according to claim 1, wherein the electrodes are arranged outside the discharge space.

3. A driving method according to claim 1, wherein at least one material selected from the group consisting of mercury, xenon gas, krypton gas, argon gas, helium gasp and neon gas is in the discharge space.

4. A driving method of a discharge apparatus having a discharge space and a pair of electrodes, comprising the steps of:

applying a first voltage having a first frequency to at least one of the electrodes; and applying a second voltage having a second frequency, which is higher than the first frequency, while being superposed to the first voltage;

wherein a voltage having a periodically attenuated or increased amplitude is used as the second voltage having the second frequency, and wherein the attenuated or increased period is synchronized with that of the first frequency.

5. A driving method according to claim 1, wherein the amplitude of the second voltage having the second frequency is made smaller than the amplitude of the first voltage having the first frequency.

6. A driving method of a discharge apparatus having a discharge space and a pair of electrodes, comprising the steps of:

applying a first voltage having a first frequency to at least one of the electrodes; and applying a second voltage having a second frequency, which is higher than the first frequency, while being superposed to the first voltage;

wherein the second voltage having the second frequency is generated by an inductance component.

7. A driving method of a discharge apparatus having a discharge space and a pair of electrodes, comprising the steps of:

applying a first voltage having a first frequency to at least one of the electrodes; and applying a second voltage having a second frequency, which is higher than the first frequency, while being superposed to the first voltage;

wherein the second frequency is selected to be equal or close to the resonance frequency of electrons, ions, or plasma existing in the discharge apparatus.

8. A driving method according to claim 1, wherein the first frequency is selected to be no less than 30 kHz.

9. A driving method according to claim 1, wherein the first voltage is composed of rectangular pulses having a width of no more than 10 $\mu$s.

10. A discharge apparatus comprising:

a discharge container;

a pair of electrodes arranged at the discharge container;

a pair of first drive voltage generators respectively coupled to respective ones of the electrodes for applying a first voltage having a first frequency between the electrodes; and a pair of second drive voltage generators respectively coupled to respective ones of the electrodes for applying a second voltage having a second frequency which is higher than the first frequency between the electrodes by superposing the second voltage on the first voltage;

wherein the first voltage and the second voltage superposed thereon applied between the electrodes establish a discharge in the discharge container.

11. A discharge apparatus according to claim 10, wherein the electrodes are arranged outside the discharge container.

12. A discharge apparatus according to claim 10, wherein the electrodes are arranged inside the discharge container.

13. A discharge apparatus comprising:

a discharge container;

a pair of electrodes arranged at the discharge container;

a pair of drive voltage generators respectively coupled to respective ones of the electrodes for applying a first voltage having a first frequency between the electrodes; and a pair of coils respectively connected between respective ones of the drive voltage generators and respective ones of the electrodes for applying a second voltage having a second frequency which is higher than the first frequency between the electrodes by superposing the second voltage on the first voltage;

wherein the first voltage and the second voltage superposed thereon applied between the electrodes establish a discharge in the discharge container.

14. A discharge apparatus comprising:

a discharge container;

a pair of electrodes arranged at the discharge container;

a circuit coupled to the electrodes;

a first drive voltage generator coupled to the circuit for generating a first voltage having a first frequency; and a second drive voltage generator coupled to the circuit for generating a second voltage having a second frequency which is higher than the first frequency;

wherein the circuit superposes the second voltage on the first voltage and applies the first voltage and the second voltage superposed thereon between the electrodes to establish a discharge in the discharge container.

* * * * *